United States Patent
Xue et al.

(10) Patent No.: US 9,616,448 B2
(45) Date of Patent: Apr. 11, 2017

(54) WHEEL SPRAYING DEVICE

(71) Applicants: Bowen Xue, Qinhuangdao (CN);
Jiandong Guo, Qinhuangdao (CN);
Weidong Liu, Qinhuangdao (CN);
Changjiu Ren, Qinhuangdao (CN);
Yongning Wang, Qinhuangdao (CN);
Zhihua Zhu, Qinhuangdao (CN);
Changhai Li, Qinhuangdao (CN)

(72) Inventors: Bowen Xue, Qinhuangdao (CN);
Jiandong Guo, Qinhuangdao (CN);
Weidong Liu, Qinhuangdao (CN);
Changjiu Ren, Qinhuangdao (CN);
Yongning Wang, Qinhuangdao (CN);
Zhihua Zhu, Qinhuangdao (CN);
Changhai Li, Qinhuangdao (CN)

(73) Assignee: CITIC DICASTAL Co., LTD, Qinhuangdao, Hebei Province (CN)

( * ) Notice: Subject to any disclaimer, the term of this patent is extended or adjusted under 35 U.S.C. 154(b) by 54 days.

(21) Appl. No.: 14/664,206

(22) Filed: Mar. 20, 2015

(65) Prior Publication Data
US 2015/0273493 A1    Oct. 1, 2015

(30) Foreign Application Priority Data
Mar. 25, 2014    (CN) .......................... 2014 1 0112932

(51) Int. Cl.
| | | |
|---|---|---|
| B05B 3/02 | (2006.01) |
| B05B 15/04 | (2006.01) |
| B05C 13/02 | (2006.01) |
| B05B 13/02 | (2006.01) |
| B21H 1/10 | (2006.01) |
| B60B 3/00 | (2006.01) |

(52) U.S. Cl.
CPC ...... *B05B 13/0285* (2013.01); *B05B 15/0487* (2013.01); *B05C 13/02* (2013.01); *B21H 1/10* (2013.01); *B05B 13/0228* (2013.01); *B05B 13/0235* (2013.01); *B05B 15/0462* (2013.01); *B60B 3/00* (2013.01)

(58) Field of Classification Search
None
See application file for complete search history.

(56) References Cited

U.S. PATENT DOCUMENTS 4,314,524 A * 2/1982 Deguchi .............. B65G 47/902
                                                      118/416

FOREIGN PATENT DOCUMENTS

CN          203764458 U  *  8/2014  ............. B05B 13/02

* cited by examiner

*Primary Examiner* — Binu Thomas
(74) *Attorney, Agent, or Firm* — AKC Patents, LLC; Aliki K. Collins

(57) ABSTRACT

The present invention provides a wheel spraying device, comprising a frame, an electric motor, a hollow shaft, a ring flange, and cylinders. During use of the device, the need of jacking up and rotating a wheel in wheel spraying can be met, and the difficulty of removing the protection plugs of bolt hole due to thickening and clogging after completion of spraying can be completely avoided. Meanwhile, the device has the characteristics of simple structure, convenience for use, low manufacturing cost, and safe and stable performance.

1 Claim, 1 Drawing Sheet

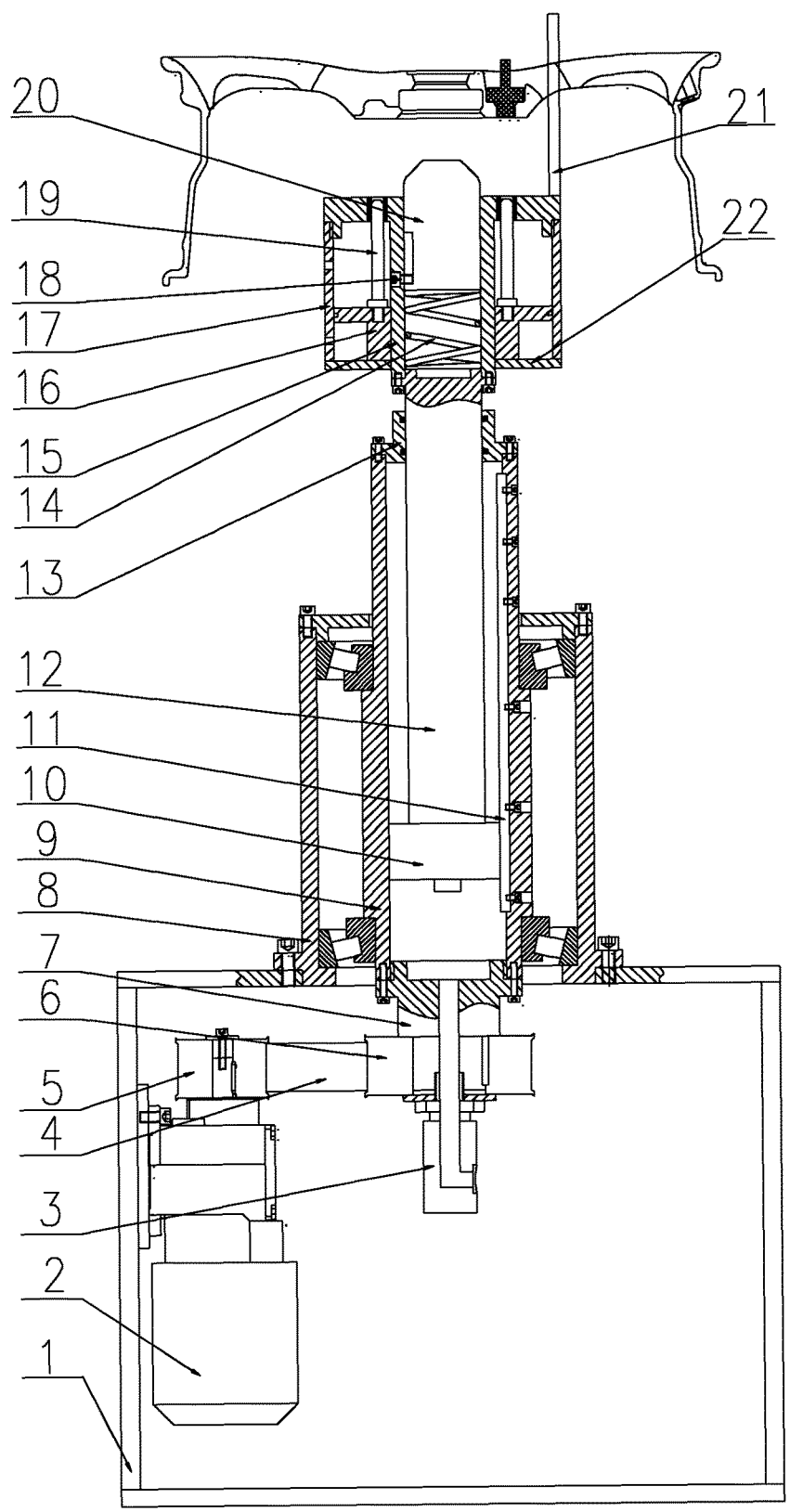

WHEEL SPRAYING DEVICE

TECHNICAL FIELD

The present invention relates to a wheel spraying device, more particularly to a device for use in wheel spraying.

BACKGROUND ART

During manufacture of an aluminium alloy wheel, wheel spraying is an indispensible process to ensure its corrosion resistance and a customer's requirement for appearance. However, in spraying, as a spray head of a spray gun is stationary, wheels on an assembly line not only need to be rotatable, but also must be capable of being jacked up when reaching below the spray gun, to reach an optimum distance between the wheel and the spray gun; in addition, thickening and clogging of bolt hole protection plugs are prone to occur after completion of wheel spraying, making removing the bolt hole protection plugs manually inconvenient. In summary of the above analysis, the present invention completely solves all problems at present.

DESCRIPTION OF THE INVENTION

The object of the present invention is to provide a wheel spraying device that can meet the need of jacking up and rotating a wheel in wheel spraying, and also can facilitate removal of bolt hole protection plugs.

To achieve the above object, the present invention adopts the following technical solution: a wheel spraying device comprises a frame, an electric motor, a rotary joint, a synchronous belt, a belt pulley I, a belt pulley II, a lower end cover, a bearing seat, a hollow shaft, a lower piston, a guide flat key, a piston rod, an upper end cover, a spring, a ring flange, an upper piston, a cylinder barrel, a stop screw, jacking posts, a central positioning post, a stop lever and a bottom plate, wherein the rotary joint and the belt pulley II are fixed below the lower end cover; the electric motor, at a shaft end of which being mounted the belt pulley I, is fixed at a side surface of the frame, and drives the lower end cover and the hollow shaft to rotate by the synchronous belt; and the hollow shaft is vertically fixed in the bearing seat above the frame by a bearing.

The upper end of the piston rod is connected with the lower part of the ring flange, and the lower end of the piston rod is connected with the lower piston, which slides up and down without rotation inside the hollow shaft by the guide flat key; the upper end cover is mounted above the hollow shaft for guiding the piston rod; and the lower end cover is mounted below the hollow shaft, thus forming the cylinder I.

The upper piston, above which are mounted the jacking posts, is slidable up and down along the inner wall of the cylinder barrel and the outer wall of the lower part of the ring flange; and the outer wall of the lower part of the ring flange guides the upper piston, and the bottom plate is mounted below the cylinder barrel, thus forming the cylinder II.

The stop lever is fixed above the ring flange, and the central positioning post cooperates with the inner wall of the ring flange and floats up and down by the spring below and the stop screw.

In practice, a wheel is precisely positioned above the ring flange by virtue of the position of a valve hole of the wheel and by means of the stop lever and the central positioning post; the cylinder I allows a piston rod and the ring flange to jack up the wheel, and the electric motor drives the hollow shaft, the ring flange and the wheel to rotate by the synchronous belt; after completion of spraying, the cylinder II allows protection plugs of bolt hole to be jacked up from below by the jacking posts, facilitating removal of the bolt hole protection plugs.

During use of the device, the need of jacking up and rotating a wheel in wheel spraying can be met, and the difficulty of removing the protection plugs of bolt hole due to thickening and clogging after completion of spraying can be completely avoided. Meanwhile, the device has the characteristics of simple structure, convenience for use, low manufacturing cost, and safe and stable performance.

DESCRIPTION OF DRAWINGS

FIG. 1 is a schematic view of a structure of an automatic wheel blowing device of the present invention.

wherein: 1—frame, 2—electric motor, 3—rotary joint, 4—synchronous belt, 5—belt pulley I, 6—belt pulley II, 7—lower end cover, 8—bearing seat, 9—hollow shaft, 10—lower piston, 11—guide flat key, 12—piston rod, 13—upper end cover, 14—spring, 15—ring flange, 16—upper piston, 17—cylinder barrel, 18—stop screw, 19—jacking posts, 20—central positioning post, 21—stop lever, 22—bottom plate.

DETAILED DESCRIPTION

Details and operation of the specific device provided by the present invention will be described below in conjunction with the accompanying drawings.

The device comprises a frame 1, an electric motor 2, a rotary joint 3, a synchronous belt 4, a belt pulley I 5, a belt pulley II 6, a lower end cover 7, a bearing seat 8, a hollow shaft 9, a lower piston 10, a guide flat key 11, a piston rod 12, an upper end cover 13, a spring 14, a ring flange 15, an upper piston 16, a cylinder barrel 17, a stop screw 18, jacking posts 19, a central positioning post 20, a stop lever 21 and a bottom plate 22, wherein the rotary joint 3 and the belt pulley II 6 are fixed below the lower end cover 7; the electric motor 2, at a shaft end of which is mounted the belt pulley I 5, is fixed at a side surface of the frame 1, and drives the lower end cover 7 and the hollow shaft 9 to rotate by the synchronous belt 4; the hollow shaft 9 is vertically fixed in the bearing seat 8 above the frame 1 by a bearing.

The upper end of the piston rod 12 is connected with the lower part of the ring flange 15, and the lower end of the piston rod 12 is connected with the lower piston 10, which slides up and down without rotation inside the hollow shaft 9 by the guide flat key 11; the upper end cover 13 is mounted above the hollow shaft 9 for guiding the piston rod 12; and the lower end cover 7 is mounted below the hollow shaft 9, thus forming the cylinder I.

The upper piston 16, above which are mounted the jacking posts 19, is slidable up and down along the inner wall of the cylinder barrel 17 and the outer wall of the lower part of the ring flange 15; and the outer wall of the lower part of the ring flange 15 guides the upper piston 16, and the bottom plate 22 is mounted below the cylinder barrel 17, thus forming the cylinder II.

The stop lever 21 is fixed above the ring flange 15, and the central positioning post 20 cooperates with the inner wall of the ring flange 15 and floats up and down by the spring 14 below and the stop screw 18.

During operation, a wheel is precisely positioned above the ring flange 15 by virtue of the position of a valve hole of the wheel and by means of the stop lever 21 and the central positioning post 20; the cylinder I allows the piston rod 12 and the ring flange 15 to jack up the wheel, and the electric motor 2 drives the hollow shaft 9, the ring flange 15 and the wheel to rotate by the synchronous belt 4; after completion of spraying, the cylinder II allows protection plugs of bolt hole to be jacked up from below by jacking posts 19, and the difficulty of removing the protection plugs of bolt hole due to thickening and clogging after completion of spraying can be completely avoided.

The invention claimed is:

1. A device, comprising a frame (1), an electric motor (2), a rotary joint (3), a synchronous belt (4), a belt pulley I (5), a belt pulley II (6), a lower end cover (7), a bearing seat (8), a hollow shaft (9), a lower piston (10), a guide flat key (11), a piston rod (12), an upper end cover (13), a spring (14), a ring flange (15), an upper piston (16), a cylinder barrel (17), a stop screw (18), jacking posts (19), a central positioning post (20), a stop lever (21) and a bottom plate (22), characterized in that the rotary joint (3) and the belt pulley II (6) are fixed below the lower end cover (7); the electric motor (2), at a shaft end of which is mounted the belt pulley I (5), is fixed at a side surface of the frame (1), and drives the lower end cover (7) and the hollow shaft (9) to rotate by the synchronous belt (4); the hollow shaft (9) is vertically fixed in the bearing seat (8) above the frame (1) by a bearing;

wherein a cylinder I is formed in a manner that an upper end of the piston rod (12) is connected with a lower part of the ring flange (15), and lower end of the piston rod (12) is connected with the lower piston (10), and wherein the lower piston (10) slides up and down without rotation inside the hollow shaft (9) by the guide flat key (11), and wherein the upper end cover (13) is mounted above the hollow shaft (9) for guiding the piston rod (12), and wherein the lower end cover (7) is mounted below the hollow shaft;

wherein a cylinder 11 is formed in a manner that the upper piston (16), above which the jacking posts (19) are mounted, is slidable along the inner wall of the cylinder barrel (17) and the outer wall of the lower part of the ring flange (15), and wherein the outer wall of the lower part of the ring flange (15) guides the upper piston (16), and the bottom plate (22) is mounted below the cylinder barrel 17; and wherein the stop lever (21) is fixed above the ring flange (15), and the central positioning post (20) cooperates with the inner wall of the ring flange (15) and floats up and down by the spring (14) below and the stop screw (18).

* * * * *